(12) United States Patent
Aoki

(10) Patent No.: US 10,141,013 B1
(45) Date of Patent: Nov. 27, 2018

(54) SHINGLED MAGNETIC RECORDING DEVICE CAPABLE OF SETTING TRACK-PITCH AT TARGET TRACK AND TWO ADJACENT TRACKS

(71) Applicants: Kabushiki Kaisha Toshiba, Minato-Ku, Tokyo (JP); Toshiba Electronic Devices & Storage Corporation, Minato-ku, Tokyo (JP)

(72) Inventor: Shunsuke Aoki, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 15/911,545

(22) Filed: Mar. 5, 2018

(30) Foreign Application Priority Data

Aug. 31, 2017 (JP) .................................. 2017-167156

(51) Int. Cl.
*G11B 5/012* (2006.01)
*G11B 20/12* (2006.01)
*G11B 20/18* (2006.01)
*G11B 5/09* (2006.01)

(52) U.S. Cl.
CPC ............... *G11B 5/012* (2013.01); *G11B 5/09* (2013.01); *G11B 20/1217* (2013.01); *G11B 20/1889* (2013.01); *G11B 2020/1238* (2013.01); *G11B 2220/2516* (2013.01)

(58) Field of Classification Search
None
See application file for complete search history.

(56) References Cited

U.S. PATENT DOCUMENTS

| 8,014,097 | B1 * | 9/2011 | Sanvido ............... G11B 19/045 360/55 |
| 8,559,121 | B2 | 10/2013 | Saito et al. |
| 8,736,995 | B1 * | 5/2014 | Wiesen .............. G11B 5/59694 360/27 |
| 9,087,540 | B1 * | 7/2015 | Lee ..................... G11B 5/59627 |
| 9,093,095 | B2 | 7/2015 | Brunnett et al. |
| 9,129,628 | B1 | 9/2015 | Fallone et al. |
| 9,281,008 | B1 * | 3/2016 | Harllee, III ...... G11B 20/00601 |
| 9,607,633 | B1 * | 3/2017 | Toribio .............. G11B 20/1217 |
| 9,805,744 | B1 * | 10/2017 | Xue ....................... G11B 5/3116 |
| 2006/0232874 | A1 * | 10/2006 | Tsuchinaga ............ G11B 5/012 360/75 |

(Continued)

FOREIGN PATENT DOCUMENTS

| JP | 2000-339601 A | 12/2000 |
| JP | 2012-212488 A | 11/2012 |
| JP | 2014-049147 A | 3/2014 |

*Primary Examiner* — Tan X Dinh
(74) *Attorney, Agent, or Firm* — White & Case LLP

(57) ABSTRACT

According to one embodiment, a magnetic disk device including a disk, a head, and a controller which sets a first track pitch based on fringing when a second track is written, sets a second track pitch based on fringing when a third track is written, calculates a difference between the first track pitch and the second track pitch, sets, when the difference is less than or equal to a reference value, an area to which the first track is written in a first recording area, and sets, when the difference is greater than the reference value, the area to which the first track is written in a second recording area.

10 Claims, 9 Drawing Sheets

(56) References Cited

U.S. PATENT DOCUMENTS

2012/0176698 A1\* 7/2012 Rub .................. G11B 5/012
              360/31
2012/0250174 A1   10/2012 Sueishi et al.
2014/0268394 A1\* 9/2014 Emo ............... G11B 20/1217
              360/48

\* cited by examiner

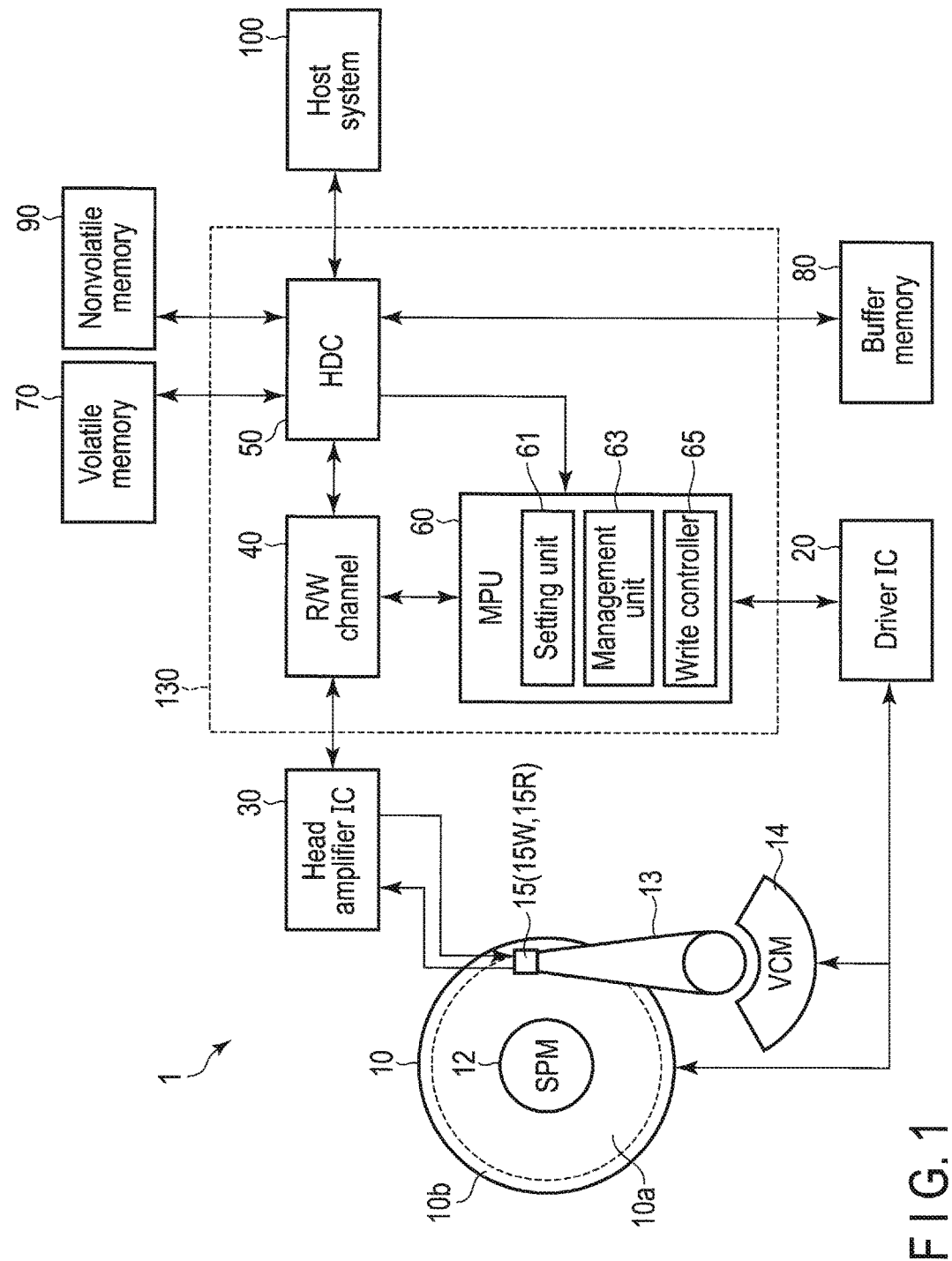
F I G. 1

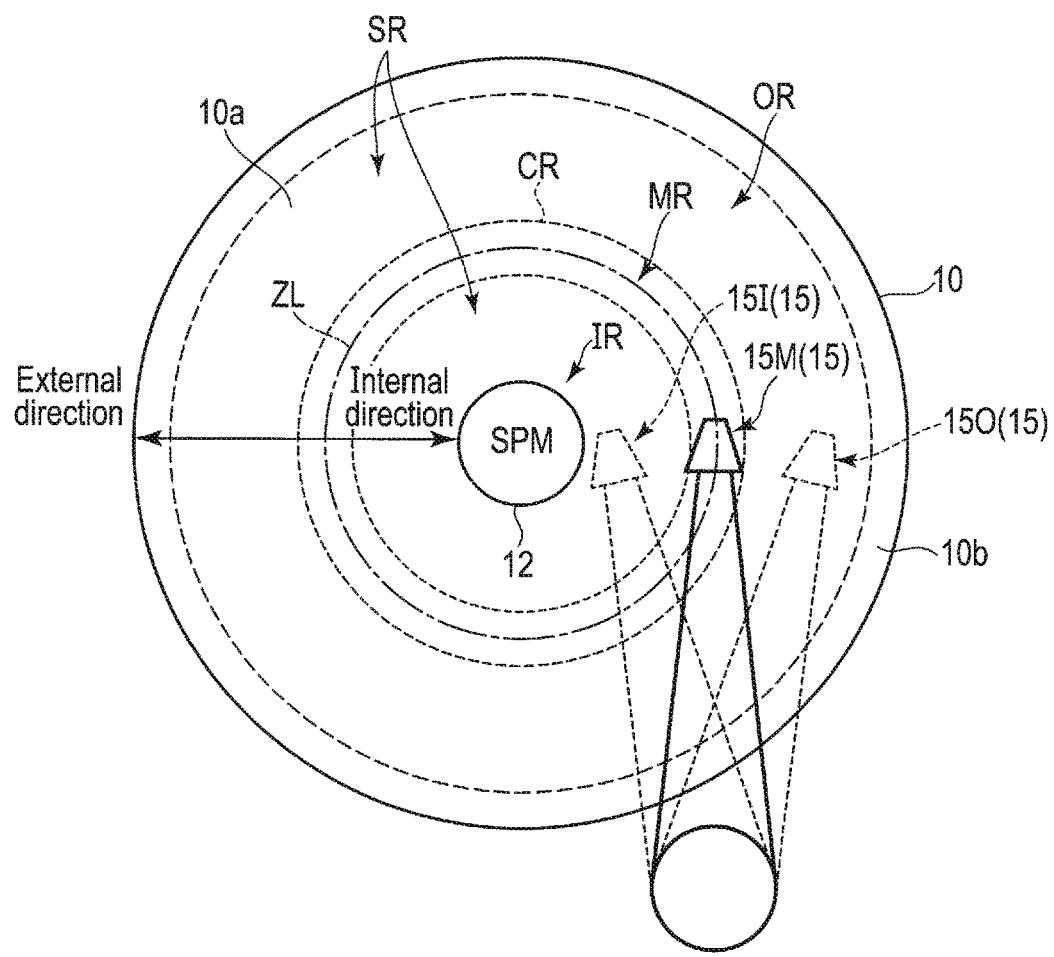
F I G. 2

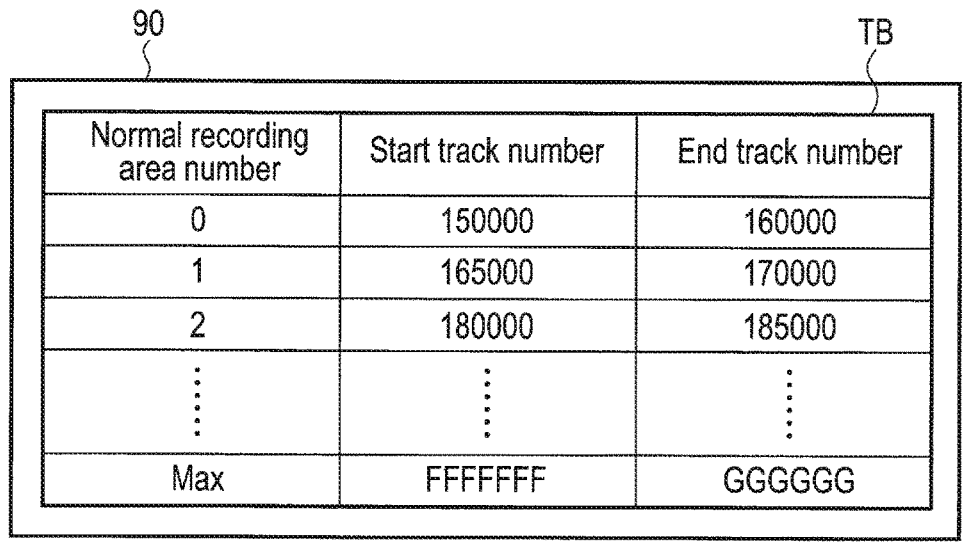
F I G. 6
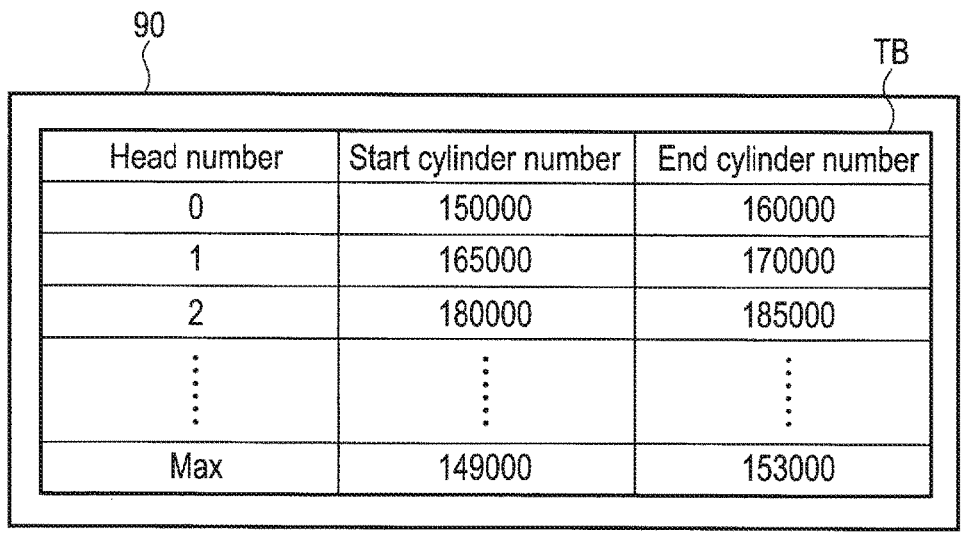
F I G. 7

SHINGLED MAGNETIC RECORDING DEVICE CAPABLE OF SETTING TRACK-PITCH AT TARGET TRACK AND TWO ADJACENT TRACKS

CROSS-REFERENCE TO RELATED APPLICATIONS

This application is based upon and claims the benefit of priority from Japanese Patent Application No. 2017-167156, filed Aug. 31, 2017, the entire contents of which are incorporated herein by reference.

FIELD

Embodiments described herein relate generally to a magnetic disk device and a method for setting a recording area.

BACKGROUND

In recent years, various technologies have been developed to increase storage capacity in magnetic disk devices. In one of the technologies, magnetic disk devices use shingled magnetic recording (SMR) to write data. The shingled magnetic recording is a recording system for writing data such that the current track partially overlaps the previously written adjacent track (hereinafter, simply referred to as the adjacent track). When magnetic disk devices write data by shingled magnetic recording, the track density (tracks per inch: TPI) of disks can be improved in comparison with normal recording (normal magnetic recording).

Magnetic disk devices used for shingled magnetic recording set a recording area for writing data by shingled magnetic recording and a recording area for writing data by normal recording. When data is written, magnetic disk devices may have the effect of fringing on the adjacent tracks. In shingled magnetic recording, the direction in which data is written is determined. Thus, the effect of fringing from only one of the two tracks adjacent to the target track should be taken into consideration. Therefore, the track pitch between the target track and the adjacent track can be narrow. In normal recording, in consideration of the effect of fringing from the two tracks adjacent to the target track, it is necessary to set the track pitch between the target track and the two adjacent tracks so as to be great.

BRIEF DESCRIPTION OF THE DRAWINGS

FIG. 1 is a block diagram showing the configuration of a magnetic disk device according to an embodiment.

FIG. 2 is a pattern diagram showing an example of the position of a head for a disk according to the embodiment.

FIG. 6 shows an example of the table of the normal recording area according to the embodiment.

FIG. 7 shows an example of the table of the normal recording area according to the embodiment.

DETAILED DESCRIPTION

Figure 3:
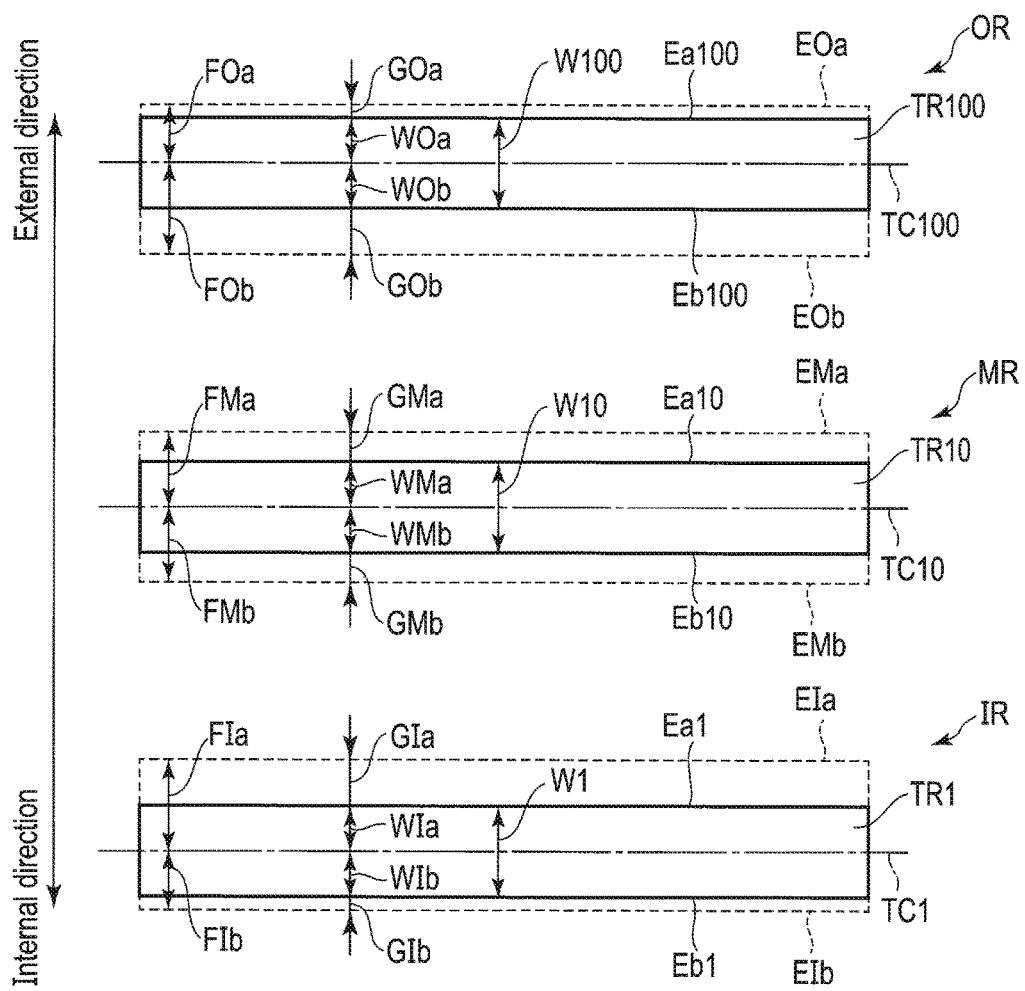
FIG. 3 is a pattern diagram showing an example of the fringing width for the position of the head on the disk according to the embodiment.

In general, according to one embodiment, a magnetic disk device comprises: a disk; a head which writes data to the disk; and a controller which sets a first track pitch between a first track of the disk and a second track away from the first track in a first direction of a radial direction of the disk based on fringing when the second track is written, sets a second track pitch between the first track and a third track away from the first track in a second direction opposite to the first direction based on fringing when the third track is written, calculates a difference between the first track pitch and the second track pitch, sets, when the difference is less than or equal to a reference value, an area to which the first track is written in a first recording area for wiring a track to a position away from an adjacent track, and sets, when the difference is greater than the reference value, the area to which the first track is written in a second recording area for writing a track such that the track partially overlaps an adjacent track.

According to another embodiment, a magnetic disk device comprises: a disk; a head which writes data to the disk; a nonvolatile memory; and a controller which sets, for a plurality of tracks of the disk, a first track pitch set based on fringing when an adjacent track away in a first direction of a radial direction of the disk is written, and a second track pitch set based on fringing when an adjacent track away in a written, records, in the nonvolatile memory, a first area from an area to which, of the tracks, a first track whose difference between the first track pitch and the second track pitch is less than or equal to a reference value is written to an area to which a second track is written, as a first recording area for writing a track to a position away from an adjacent track, and records, in the nonvolatile memory, an area of the disk other than the first recording area as a second recording area for writing a track such that the track partially overlaps an adjacent track.

According to another embodiment, a method for setting a recording area, applied to a magnetic disk device comprising a disk and a head which writes data to the disk, the method comprises: setting a first track pitch between a first track of the disk and a second track away from the first track in a first direction of a radial direction of the disk based on fringing when the second track is written; setting a second track pitch between the first track and a third track away from the first track in a second direction opposite to the first direction based on fringing when the third track is written; calculating a difference between the first track pitch and the second track pitch, and when the difference is less than or equal to a reference value, setting an area to which the first track is written in a first recording area for writing a track to a position away from an adjacent track; and when the difference is greater than the reference value, setting the area to which the first track is written in a second recording area for writing a track such that the track partially overlaps an adjacent track.

An embodiment will be described hereinafter with reference to the accompanying drawings. The drawings are merely examples, and do not limit the scope of the invention.

Embodiment

FIG. 1 is a block diagram showing the configuration of a magnetic disk device 1 according to an embodiment.

The magnetic disk device 1 comprises a head disk assembly (HDA) as described later, a driver IC 20, a head amplifier integrated circuit (hereinafter, a head amplifier IC or a preamplifier) 30, a volatile memory 70, a buffer memory (buffer) 80, a nonvolatile memory 90, and a system controller 130 which is a single-chip integrated circuit. The magnetic disk device 1 is connected to a host system (host) 100.

The HDA comprises a magnetic disk (disk) 10, a spindle motor (SPM) 12, an arm 13 comprising a head 15, and a voice coil motor (VCM) 14. The disk 10 is rotated by the spindle motor 12. The arm 13 and the VCM 14 constitute an actuator. The actuator drives the VCM 14 such that the head 15 mounted on the arm 13 moves to the target position on the disk 10. Two or more disks 10 and heads 15 may be provided.

In the magnetic disk device 1, as write systems for writing data (or tracks) to the disk 10, shingled magnetic recording (SMR) and normal recording are applied. The shingled magnetic recording is a recording system for writing a track such that a part of the track overlaps an adjacent track (in other words, a part of the track is written on an adjacent track). In normal recording (normal magnetic recording), a track is written at a position a particular interval away from the adjacent tracks. In other words, normal recording is a recording system for writing a track such that the track does not overlap the adjacent tracks. On a magnetic disk device capable of writing data by shingled magnetic recording, for example, a device managed (DM) type, a host aware (HA) type or a host managed (HM) type is mounted as firmware. On the magnetic disk device 1 of the present embodiment, HA or HM firmware is assumed to be mounted. In the HA or HM firmware, the host 100 is capable of confirming the address or storage capacity of the normal recording area of the magnetic disk device 1 by a dedicated command.

A data area 10a available for the user and a system area 10b to which information necessary for system management is written are allocated to the recording area of the disk 10. The direction along the circumference of the disk 10 is referred to as a circumferential direction. The direction perpendicular to the circumferential direction is referred to as a radial direction.

The head 15 comprises a write head 15W and a read head 15R mounted on a slider which is a main body. The write head 15W writes data by applying a recording magnetic field to the disk 10 and controlling the magnetization direction of the recording layer of the disk 10. The read head 15R reads the magnetization direction of the recording layer of the disk 10, in other words, data. The head 15 is inclined at a skew angle with respect to the circumferential direction of the disk 10 depending on the position of the disk 10. The skew angle is indicated by the angle between the line connecting the rotational center of the actuator and the central point of the head 15 and a line tangent to a track. When the head 15 writes data to the disk 10, a recording magnetic field may leak out in the radial direction for a track. The leakage of the recording magnetic field of the head 15 or the magnetization transition of the disk 10 in the radial direction for a track is referred to as fringing. Fringing may have an effect on the surrounding tracks, such as degradation of data. The distance of fringing in the radial direction (hereinafter, simply referred to as the fringing width) changes in accordance with the position of the head 15 on the disk 10, in other words, the skew angle.

FIG. 2 is a pattern diagram showing an example of the position of the head 15 for the disk 10 according to the embodiment. In the following description, in the radial direction, the direction to the external side of the disk 10 is referred to as an external direction (external side), and the opposite direction of the external direction is referred to as an internal direction (internal side).

The data area 10a is divided into an inner circumferential area IR located in the internal direction of the disk 10, an outer circumferential area OR located in the external direction of the disk 10, and a middle circumferential area MR located between the inner circumferential area. IR and the outer circumferential area OR. The data area 10a includes a shingled magnetic recording area SR for writing data by shingled magnetic recording, and a normal recording area. CR for writing data by normal recording. The normal recording area CR includes a position ZL in the radial direction at which the skew angle of the head 15 is zero. In the example shown in FIG. 2, the normal recording area CR is located in the middle circumferential area MR. In the example shown in FIG. 2, the position ZL is in the middle circumferential area MR. The normal recording area CR may be located in the inner circumferential area IR or the outer circumferential area OR. In other words, the position ZL may be in the inner circumferential area IR or the outer circumferential area OR. The shingled magnetic recording area SR is the data area 10a excluding the normal recording area CR. In the example shown in FIG. 2, the shingled magnetic recording area SR is located in the area ranging from the outer circumferential area OR other than the normal recording area CR to the middle circumferential area. MR and in the area ranging from the inner circumferential area IR to the middle circumferential area MR.

In FIG. 2, heads 15I, 15M and 15O indicate the head 15 in which the skew angle differs. Head 15I indicates the head 15 inclined at the skew angle located in the inner circumferential area IR. Head 15M indicates the head 15 inclined at the skew angle located in the middle circumferential area MR. Head 15O indicates the head 15 inclined at the skew angle located in the outer circumferential area OR. In the example shown in FIG. 2, head 15M is located at the position ZL. Thus, heads 15I and 15O are inclined at a skew angle greater than that of head 15M. In other words, in the head 15, the skew angle increases with increasing distance from the position n at which the skew angle is zero.

FIG. 3 is a pattern diagram showing an example of the fringing width for the position of the head 15 on the disk 10 according to the present embodiment. FIG. 3 shows tracks TR1, TR10 and TR100. Track TR1 is located in the inner circumferential area IR. Track TR10 is located in the middle circumferential area MR. Track TR100 is located in the outer circumferential area OR. For example, track TR1 is written by head 15I shown in FIG. 2. For example, track TR10 is written by head 15M shown in FIG. 2. For example, track TR100 is written by head 15O shown in FIG. 2. FIG. 3 shows width W1 of track TR1 in the radial direction (hereinafter, referred to as a track width), track width W10 of track TR10 and track width W100 of track TR100. In FIG. 3, track widths W1, W10 and W100 are equivalent to the width of the write head 15W, and are substantially the same as each other. FIG. 3 also shows track center TC1 of track TR1, track center TC10 of track TR10 and track center TC100 of track TR100. Track centers TC1, TC10 and TC100 are the tracks of the central positions of track widths W1, E10 and W100 at the positions of tracks TR1, TR10 and TR100 in the circumferential direction, respectively. In other words, track centers TC1, TC10 and TC100 are the tracks of the write head 15W. In the example shown in FIG. 3, track centers TC1, TC10 and TC100 are linearly shown for the sake of convenience. However, actual track centers TC1, TC10 and TC100 are curved along the circumferential direction of the disk 10. Thus, actual tracks TR1, TR10 and TR100 are also curved along the circumferential direction of the disk 10.

In the example shown in FIG. 3, when track TR1 is written to the inner circumferential area IR by head 15I shown in FIG. 2, fringing (outer fringing) having width (outer fringing width) FIa may be generated on the external side from track center TC1. Fringing (inner fringing) having width. (inner fringing width) FIb may be generated on the internal side from track center TC1. In this case, outer fringing width FIa is greater than inner fringing width FIb (FIa>FIb). Outer fringing width. FIa includes distance (outer track distance) WIa between track center TC1 of track TR1 and outer end portion Ea1 of track TR1, and distance (outer fringing gap) GIa between outer end portion. Hal of track TR1 and outer position EIa affected by fringing, in other words, end portion EIa of outer fringing. Inner fringing width FIb includes distance (inner track distance) WIb between track center TC1 of track TR1 and inner end portion Eb1 of track TR1, and distance (inner fringing gap) GIb between inner end portion Eb1 of track TR1 and inner position EIb affected by fringing, in other words, end portion EIb of inner fringing. The sum of outer track distance WIa and inner track distance WIb is equivalent to track width W1. In the example shown in FIG. 3, outer track distance WIa is the same as inner track distance WIb. Thus, outer fringing gap GIa is greater than inner fringing gap GIb (GIa>GIb).

In the example shown in FIG. 3, when track TR10 is written to the middle circumferential area MR by head 15M shown in FIG. 2, outer fringing having width FMa and inner fringing having width FMb may be generated. In this case, outer fringing width FMa is substantially or completely the same as inner fringing width FMb (FMa FMb or FMa=FMb). Outer fringing width FMa includes outer track distance WMa between track center TC10 of track TR10 and outer end portion Ea10 of track TR10, and outer fringing gap GMa between outer end portion Ea10 of track TR10 and end portion EMa of outer fringing. Inner fringing width FMb includes inner track distance WMb between track center TC10 of track TR10 and inner end portion Eb10 of track TR10, and inner fringing gap GMb between outer end portion Eb10 of track TR10 and end portion EMb of outer fringing. The sum of outer track distance WMa and inner track distance WMb is equivalent to track width W10. In the example shown in FIG. 3, outer track distance WMa is the same as inner track distance WMb. Thus, outer fringing gap GMa is substantially or completely the same as inner fringing gap GMb (GMa GMb or GMa=GMb).

In the example shown in FIG. 3, when track TR100 is written by head 15O shown in FIG. 2, outer fringing having width FOa and inner fringing having width FOb may be generated. In this case, inner fringing width FOb is greater than outer fringing width FOa (FOa<FOb). Outer fringing width FOa includes outer track distance WOa between track center TC100 of track TR100 and outer end portion Ea100 of track TR100, and outer fringing gap GOa between outer end portion Ea100 of track TR100 and end portion EOa of outer fringing. Inner fringing width. FOb includes inner track distance WOb between track center TC100 of track TR100 and inner end portion Eb100 of track TR100, and inner fringing gap GOb between inner end portion Eb100 of track TR100 and end portion EOb of inner fringing. The sum of outer track distance WOa and inner track distance WOb is equivalent to track width W100. In the example shown in FIG. 3, outer track distance WOa is the same as inner track distance WOb. Thus, inner fringing gap GOb is greater than outer fringing gap GOa (Goa<Gob).

The driver IC 20 controls the driving of the SPM 12 and the VCM 14 in accordance with the control of the system controller 130 (specifically, a micro processing unit [MPU] 60 as described later).

The head amplifier IC (preamplifier) 30 comprises a read amplifier and a write driver (not shown). The read amplifier amplifies a read signal read from the disk 10 and outputs the read signal to the system controller 130 (specifically, a read/write [R/W] channel 40 as described later). The write driver outputs write current to the head 15 in accordance with the write data output from the R/W channel 40. The head amplifier IC 30 is electrically connected to the head 15 and the R/W channel 40.

The volatile memory 70 is a semiconductor memory in which the stored data is lost when power supply is stopped. For example, data necessary for the process of each unit of the magnetic disk device 1 is stored in the volatile memory 70. The volatile memory 70 is, for example, a dynamic random access memory (DRAM) or a synchronous dynamic random access memory (SDRAM).

The buffer memory 80 is a semiconductor memory which temporarily records, for example, data transferred between the magnetic disk device 1 and the host 100. The buffer memory 80 may be integrally formed with the volatile memory 70. The buffer memory 80 is, for example, a DRAM, a static random access memory (SRAM), an SDRAM, a ferroelectric random access memory (FeRAM) or a magnetoresistive random access memory (MRAM).

The nonvolatile memory 90 is a semiconductor memory which retains the stored data even when power supply is stopped. The nonvolatile memory 90 is, for example, a NOR or NAND flash read only memory (FROM).

The system controller (controller) 130 is realized by, for example, using a large-scale integration (LSI) circuit called a System-on-a-Chip (SoC), in which a plurality of elements are integrated into a single chip. The system controller 130 includes the read/write (R/W) channel 40, a hard disk controller (HDC) 50 and the microprocessor (MPU) 60. The system controller 130 is electrically connected to the driver IC 20, the head amplifier IC 30, the volatile memory 70, the buffer memory 80, the nonvolatile memory 90 and the host 100.

The R/W channel 40 performs the signal process of read data and write data. The R/W channel 40 comprises a circuit or function for measuring the signal quality of read data. The R/W channel 40 is electrically connected to the head amplifier IC 30, the HDC 50 and the MPU 60.

The HOC 50 controls data transfer between the host 100 and the R/W channel 40 in accordance with an instruction from the MPU 60 described later. The HDC 50 is electrically connected to the R/W channel 40, the MPU 60, the volatile memory 70, the buffer memory 80, the nonvolatile memory 90 and the host 100.

The MPU 60 is a main controller which controls each unit of the magnetic disk device 1. The MPU 60 performs servo control for controlling the VCM 14 through the driver IC 20 and determining the position of the head 15. The MPU 60 controls the operation for writing data to the disk 10, and selects the storage destination of the write data transmitted from the host 100. The MPU 60 controls the operation for reading data from the disk 10, and controls the process of the read data transmitted from the disk 10 to the host 100. In the following description, write data and read data may be simply referred to as data. The MPU 60 is connected to each unit of the magnetic disk device 1. For example, the MPU 60 is electrically connected to the R/W channel 40 and the HOC 50.

The MPU 60 includes a setting unit 61, a management unit 63 and a write controller 65. The MPU 60 performs the processes of these units on firmware.

The setting unit 61 sets the track pitch between the target track and a track (adjacent track) adjacent to the target track in normal recording. For example, on the basis of the inner fringing width when an adjacent track (outer adjacent track) is written to a position away from the target track on the external side, the setting unit 61 sets the track pitch between the target track and the outer adjacent track. Similarly, on the basis of the outer fringing width when an adjacent track (inner adjacent track) is written to a position away from the target track on the internal side, the setting unit 61 sets the track pitch between the target track and the inner adjacent track. The setting unit 61 records the set track pitches in, for example, the system area 10*b* or the nonvolatile memory 90.

Figure 4:
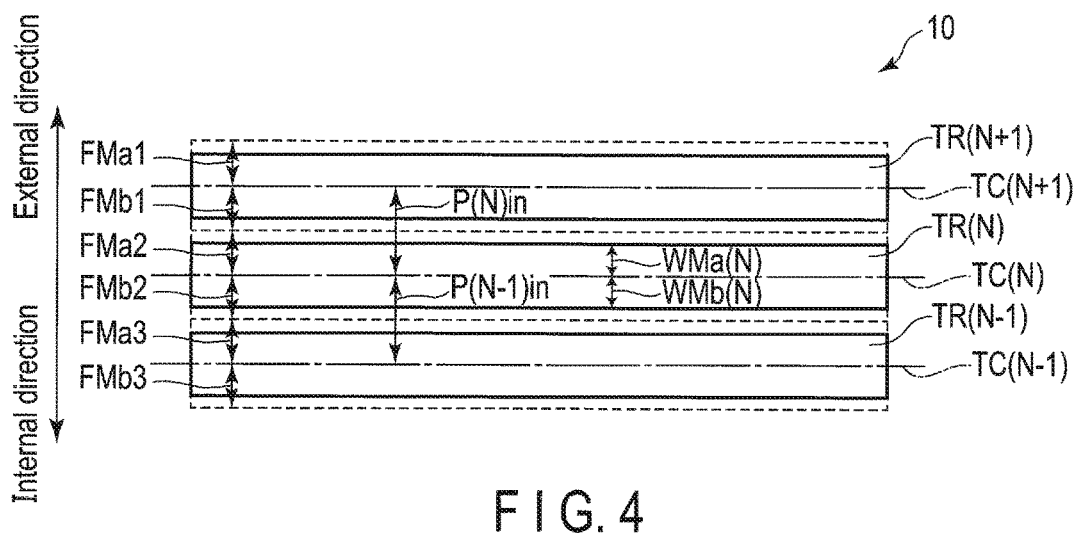
FIG. 4 is a pattern diagram shown for explaining an example of a method for setting a track pitch according to the embodiment.

FIG. 4 is a pattern diagram shown for explaining an example of a method for setting a track pitch according to the embodiment. In FIG. 4, tracks TR(N+1), TR(N) and TR(N−1) are arranged in the radial direction. FIG. 4 shows track center TC(N+1) of track. TR(N+1), track center TC(N) of track TR(N), and track center TC(N−1) of track TR(N−1). The track width of track TR(N) is equivalent to the sum of outer track distance WMa(N) and inner track distance WMb(N). Track TR (N+1) is written to a position away from track TR(N) on the external side with a particular track pitch (outer track pitch). Track TR(N−1) is written to a position away from track TR(N) on the internal side with a particular track pitch. (inner track pitch). Outer fringing width FMa1 indicates the distance between track center TC(N+1) and the position affected by the fringing generated on the external side of track TR(N+1) when track TR(N+1) is written. Inner fringing width FMb1 indicates the distance between track center TC(N+1) and the position affected by the fringing generated on the internal side of track TR(N+1) when track TR(N+1) is written. Outer fringing width FMa2 indicates the distance between track center TC(N) and the position affected by the fringing generated on the external side of track TR(N) when track TR(N) is written. Inner fringing width FMb2 indicates the distance between track center TC(N) and the position affected by the fringing generated on the internal side of track TR(N) when track TR(N) is written. Outer fringing width FMa3 indicates the distance between track center TC(N−1) and the position affected by the fringing generated on the external side of track TR(N−1) when track TR(N−1) is written. Inner fringing width FMb3 indicates the distance between track center TC(N−1) and the position affected by the fringing generated on the internal side of track TR(N−1) when track TR (N−1) is written.

For example, the setting unit 61 writes the target track TR(N) to a particular position of the disk 10, reads the written target track TR(N), and measures the error rate (initial error rate) of the target track. TR(N). Subsequently, the setting unit 61 writes the outer adjacent track TR(N+1) with a particular track pitch (outer initial track pitch) P(N)in relative to the target track TR(N), reads the written target track TR(N) again, and measures the error rate of the target track TR(N) again. The setting unit 61 determines whether the error rate is less than a threshold (outer threshold), or greater than or equal to the outer threshold. When the setting unit 61 determines that the error rate is greater than or equal to the outer threshold, the setting unit 61 changes the outer initial track pitch P(N)in to the next outer track pitch. In other words, when the setting unit 61 determines that the target track TR(N) is affected by fringing at the time of writing the outer adjacent track TR(N+1), the setting unit 61 changes the outer initial track pitch P(N)in to the next outer track pitch, for example, to the next outer track pitch less than the outer initial track pitch P(N)in. Alternatively, the setting unit 61 may change the outer initial track pitch P(N)in to the next outer track pitch greater than the outer initial track pitch P(N)in. The setting unit 61 determines whether the error rate is less than the outer threshold, or greater than or equal to the outer threshold again. When the setting unit 61 determines that the error rate is greater than or equal to the outer threshold, the setting unit 61 changes the current track pitch to the next outer track pitch, for example, to the next outer track pitch less than the current track pitch. Alternatively, the setting unit 61 may change the current track pitch to the next outer track pitch greater than the current track pitch. Until the error rate falls below the outer threshold, the setting unit 61 repeats a process for changing the current outer track pitch to the next track pitch, writing the outer adjacent track TR(N+1) to a position away from the target track TR(N) with the current (changed) outer track pitch and measuring the error rate of the target track TR(N). When the setting unit 61 determines that the error rate is less than the outer threshold, the setting unit 61 sets the current outer track pitch to the outer track pitch between the target track TR(N) and the outer adjacent track TR(N+1). In other words, when the setting unit 61 determines that the target track TR(N) is not substantially affected by fringing at the time of writing the outer adjacent track TR(N+1), the setting unit 61 sets the current outer track pitch to the outer track pitch between the target track TR(N) and the outer adjacent track TR(N+1). The setting unit 61 records the set outer track pitch in, for example, the system area 10*b* or the nonvolatile memory 90.

Similarly, the setting unit 61 writes the target track TR(N) to a particular position of the disk 10, reads the written target track TR(N), and measures the initial error rate of the target track TR(N). Subsequently, the setting unit 61 writes the inner adjacent track TR(N−1) with a particular track pitch (inner initial track pitch) P(N−1)in relative to the target track TR(N), reads the written target track TR(N) again, and measures the error rate of the target track TR(N) again. The inner initial track pitch P(N−1)in is set to a distance such that the outer fringing of the inner adjacent track TR(N−1) does not have an effect on the target track TR(N). The setting unit 61 determines whether the error rate is less than a threshold (inner threshold), or greater than or equal to the inner threshold. When the setting unit 61 determines that the error rate is greater than or equal to the inner threshold, the setting unit 61 changes the inner initial track pitch. P(N−1)in to the next inner track pitch. In other words, when the setting unit 61 determines that the target track TR(N) is affected by fringing at the time of writing the inner adjacent track. TR(N−1), the setting unit 61 changes the inner initial track pitch P(N−1)in to the next inner track pitch, for example, to the next inner track pitch less than the inner initial track pitch P(N−1)in. Alternatively, the setting unit 61 may change the inner initial track pitch P(N−1)in to the next inner track pitch greater than the inner initial track pitch P(N−1)in. The setting unit 61 determines whether the error rate is less than the inner threshold, or greater than or equal to the inner threshold again. When the setting unit 61 determines that the error rate is greater than or equal to the inner threshold, the setting unit 61 changes the current track pitch to the next inner track pitch, for example, to the next inner track pitch less than the current track pitch. Alternatively, the setting unit 61 may change the current track pitch to the next inner track pitch greater than the current track pitch. Until the error rate falls below the inner threshold, the setting unit 61 repeats a process for changing the current inner track pitch to the next track pitch, writing the inner adjacent track TR(N−1) to a position away from the target track TR(N) with the current (changed) inner track pitch and measuring the error rate of the target track TR(N). When the setting unit 61 determines that the error rate is less than the inner threshold, the setting unit 61 sets the current inner track pitch to the inner track pitch between the target track TR(N) and the inner adjacent track TR(N−1). In other words, when the setting unit 61 determines that the target track TR(N) is not substantially affected by fringing at the time of writing the inner adjacent track TR(N−1), the setting unit 61 sets the current inner track pitch to the inner track pitch between the target track TR(N) and the inner adjacent track TR(N−1). The setting unit 61 records the set inner track pitch in, for example, the system area 10b or the nonvolatile memory 90. The outer threshold and the inner threshold may be the same as each other or different from each other.

The setting unit 61 applies the above process to the disk 10, for example, to the tracks located in a particular area of the data area 10a, and sets the outer and inner track pitches of the tracks located in the particular area. The setting unit 61 records the set outer and inner track pitches of the tracks located in the particular area in, for example, the system area 10b or the nonvolatile memory 90. The particular area is, for example, the middle circumferential area. The setting unit 61 may apply the above process to all the tracks of the data area 10a and set the outer and inner track pitches of all the tracks.

The management unit 63 sets the normal recording area CR and the shingled magnetic recording area SR on the disk 10, for example, in the data area 10a, based on the outer and inner track pitches set in the setting unit 61, and manages the set normal recording area CR and shingled magnetic recording area SR.

For example, the management unit 63 compares the outer track pitch of a particular track of the data area 10a with the inner track pitch, and calculates the difference between the outer track pitch and the inner track pitch. The management unit 63 determines whether the difference is less than or equal to a reference value which is the threshold of the difference, or greater than the reference value. When the management unit 63 determines that the difference is less than or equal to the reference value, the management unit 63 sets the area to which the target track is written in the normal recording area CR, records, for example, in the system area 10b or the nonvolatile memory 90, the information of the set area to which the target track is written in the normal recording area CR, and manages the information of the set area to which the target track is written in the normal recording area CR by a table. The information of the area to which the target track is written includes, for example, the track number, and the numbers of some divisional areas (zones) of the data area 10a. In this case, the management unit 63 determines whether or not the difference is zero. When the management unit 63 determines that the difference is not zero, the management unit 63 sets the less of the outer and inner track pitches as the track pitch between the target track and the adjacent tracks (the outer and inner adjacent tracks), and records the set track pitch in, for example, the system area 10b or the nonvolatile memory 90. When the management unit 63 determines that of the outer track pitch and the inner track pitch to the track pitch between the target track and the adjacent tracks, and records the set track pitch in, for example, the system area 10b or the nonvolatile memory 90. When the management unit 63 determines that the difference is greater than the reference value, the management unit 63 sets the area to which the target track is written in the shingled magnetic recording area SR, and records, for example, in the system area 10b or the nonvolatile memory 90, the information of the set area to which the target rack is written in the shingled magnetic recording area SR. The reference value may be either a fixed value or a variable. The reference value may be changed. A plurality of reference values may be set. For example, the reference value may be set for either each zone or each head.

The management unit 63 applies the above process to the disk 10, for example, to the tracks located in a particular area of the data area 10a, and sets, in the normal recording area CR, some areas to which, of the tracks, some tracks whose difference between the outer track pitch and the inner track pitch is less than or equal to the reference value are written, respectively. The management unit 63 records, for example, in the system area 10b or the nonvolatile memory 90, the information of the set areas to which the tracks are written in the normal recording area CR, and manages the information of the set areas to which the tracks are written in the normal recording area CR by a table. The management unit 63 sets the disk 10 other than the normal recording area CR, for example, the data area 10a, in the shingled magnetic recording area SR. The management unit 63 records, for example, in the system area 10b or the nonvolatile memory 90, the information of the set areas to which the tracks are written in the shingled magnetic recording area SR. The management unit 63 may perform the above process to all the tracks of the data area 10a and set, in the normal recording area CR, some areas to which, of all the tracks, some tracks whose difference between the outer track pitch and the inner track pitch is less than or equal to the reference value are written, respectively. The management unit 63 may set a plurality of normal recording areas CR, set the normal recording area CR for each head and set a particular zone of the data area 10a in the normal recording area CR.

Now, this specification shows some examples of the table TB of the recording area CR with reference to FIG. 5, FIG. 6, FIG. 7, FIG. 8, FIG. 9, FIG. 10, FIG. 11 and FIG. 12.

FIG. 5 to FIG. 12 show some examples of the table TB of the normal recording area CR according to the embodiment. In the examples shown in FIG. 5 to FIG. 12, the table TB is recorded in the nonvolatile memory 90. The table shown in FIG. 5 to FIG. 12 may be recorded in the system area 10b of the disk 10 or other memories, etc.

Figure 5:
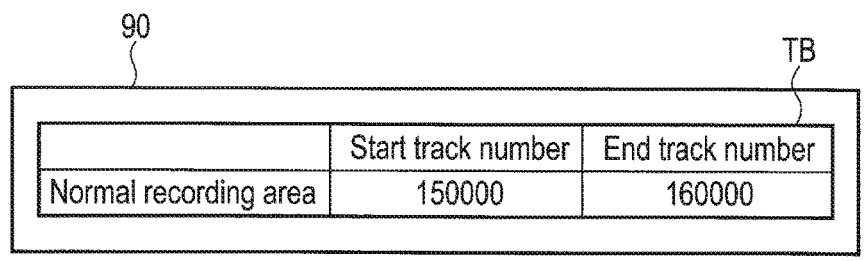
FIG. 5 shows an example of the table of a normal recording area according to the embodiment.

FIG. 5 shows an example of the table TB when a particular area of the disk 10 is set in the normal recording area CR. In FIG. 5, the start track number is the number of the area to which the initial track is written in the normal recording area CR. The end track number is the number of the area to which the last track is written in the normal recording area CR. Thus, the normal recording area CR is the area between the track of the start track number and the track of the end track number.

In the example shown in FIG. 5, the management unit 63 records the areas from the $150000^{th}$ area to the $160000^{th}$ area as the normal recording area CR in the table TB. The management unit 63 sets the area of the data area 10a other than the normal recording area CR as the shingled magnetic recording area SR.

FIG. 6 shows an example of the table TB when a plurality of normal recording areas CR are set. In FIG. 6, the normal recording area number indicates the number of each set normal recording area CR. In FIG. 6, the table TB shows the start track number and the end track number for each normal recording area number.

In the example shown in FIG. 6, the management unit 63 comprises, for example, a reference value for each area in a particular range set in the data area 10a. Thus, the management unit 63 sets the normal recording area CR for each area. The management unit 63 records, in the table TB, the areas from the $150000^{th}$ area to the $160000^{th}$ area as the $0^{th}$ normal recording area CR, the areas from the $165000^{th}$ area to the $170000^{th}$ area as the first normal recording area CR, the areas from the $180000^{th}$ area to the $185000^{th}$ area as the second normal recording area CR, and the areas from the $FFFFFF^{th}$ area to the $GGGGGG^{th}$ area as the $max^{th}$ normal recording area CR. The management unit 63 sets the area of the data area 10a other than the normal recording area CR as the shingled magnetic recording area SR.

FIG. 7 shows an example of the table TB when the normal recording area CR is set for each different head 15. In FIG. 7, the head number indicates the number for identifying each different head 15. In FIG. 7, the table TB shows the start cylinder (or start track) number and the end cylinder (or end track) number for each head number.

In the example shown in FIG. 7, the management unit 63 comprises a reference value for each different head 15. Thus, the disk 10 to which the normal recording area CR is set by the management unit 63 differs depending on the head 15. The management unit 63 records, in the table TB, the areas from the $150000^{th}$ area to the $160000^{th}$ area as the normal recording area CR of the $0^{th}$ head 15, the areas from the $165000^{th}$ area to the $170000^{th}$ area as the normal recording area CR of the first head 15, the areas from the $180000^{th}$ area to the $185000^{th}$ area as the normal recording area CR of the second head 15, and the areas from the $149000^{th}$ area to the $153000^{th}$ area as the normal recording area CR of the $max^{th}$ head 15. The management unit 63 sets the area of the data area 10a other than the normal recording area CR as the shingled magnetic recording area SR.

Figure 8:
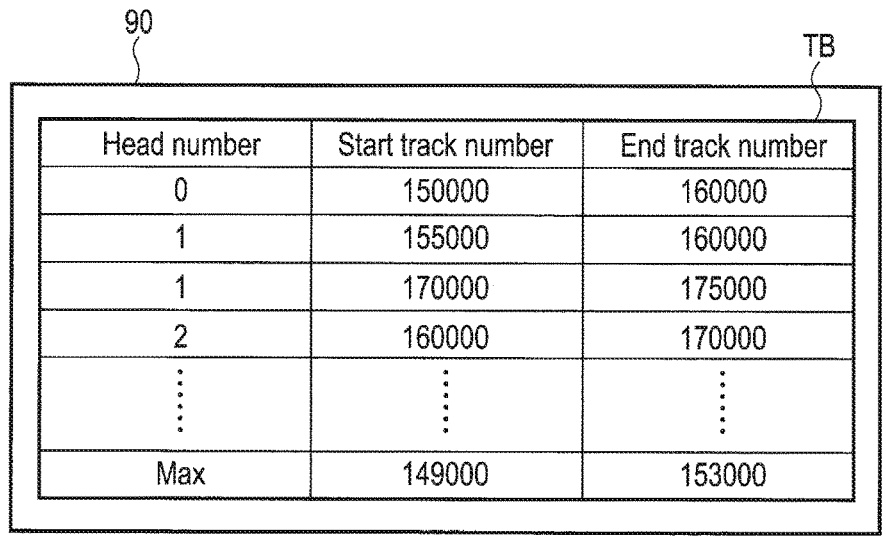
FIG. 8 shows an example of the table of the normal recording area according to the embodiment.

FIG. 8 shows an example of the table TB when at least one normal recording area CR is set for each different head 15.

In the example shown in FIG. 8, the management unit 63 comprises a reference value for each area in a particular range set in the data area 10a of the disk 10 of each different head 15. Thus, the management unit 63 sets at least one normal recording area CR for each different head 15. The management unit 63 records, in the table TB, the areas from the $150000^{th}$ area to the $160000^{th}$ area as the normal recording area CR of the $0^{th}$ head 15, the areas from the $155000^{th}$ area to the $160000^{th}$ area as the normal recording area CR of the first head 15, the areas from the $170000^{th}$ area to the $175000^{th}$ area as the normal recording area CR of the first head 15, the areas from the $160000^{th}$ area to the $170000^{th}$ area as the normal recording area CR of the second head 15, and the areas from the $149000^{th}$ area to the $153000^{th}$ area as the normal recording area CR of the $max^{th}$ head 15. The management unit 63 sets the area of the data area 10a other than the normal recording area CR as the shingled magnetic recording area SR.

Figure 9:
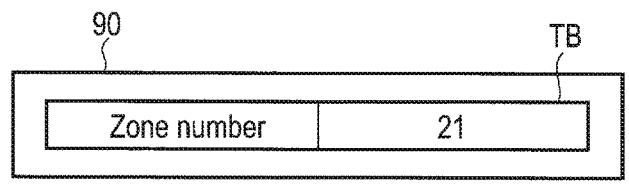
FIG. 9 shows an example of the table of the normal recording area according to the embodiment.

FIG. 9 shows an example of the table TB when a zone is set in the normal recording area CR.

For example, when the difference between the outer track pitch and the inner track pitch of a specific track of the target zone is less than or equal to a reference value, the management unit 63 sets the target zone in the normal recording area CR. For example, the management unit 63 may be configured to set the target zone in the normal recording area CR when the mean value of the differences between the outer track pitches and the inner track pitches of the tracks included in the target zone is less than or equal to a reference value. For example, the management unit 63 may be configured to set the target zone in the normal recording area CR when the differences between the outer track pitches and the inner track pitches of all the tracks included in the target zone are less than or equal to a reference value. In the example shown in FIG. 9, the management unit 63 records the $21^{st}$ zone as the normal recording area CR in the table TB. The management unit 63 sets the area of the data area 10a other than the normal recording area CR as the shingled magnetic recording area SR.

Figure 10:
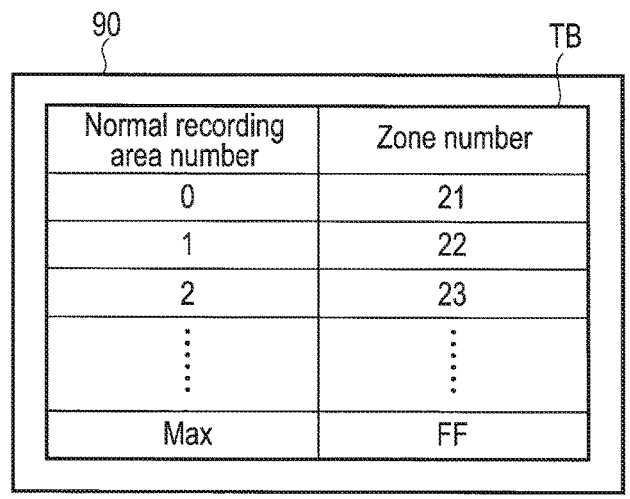
FIG. 10 shows an example of the table of the normal recording area according to the embodiment.

FIG. 10 shows an example of the table TB when a plurality of normal recording areas CR are set. In the table TB shown in FIG. 10, the zone number is shown for each normal recording area number.

In the example shown in FIG. 10, the management unit 63 comprises the reference value of the difference between the outer track pitch and the inner track pitch for each zone. Thus, the management unit 63 sets the normal recording area CR for each zone. The management unit 63 records, in the table TB, the $21^{st}$ zone as the $0^{th}$ normal recording area CR, the $22^{nd}$ zone as the first normal recording area CR, the $23^{rd}$ zone as the second normal recording area CR, and the $FF^{th}$ zone as the $max^{th}$ normal recording area CR. The management unit 63 sets the area of the data area 10a other than the normal recording area CR as the shingled magnetic recording area SR.

Figure 11:
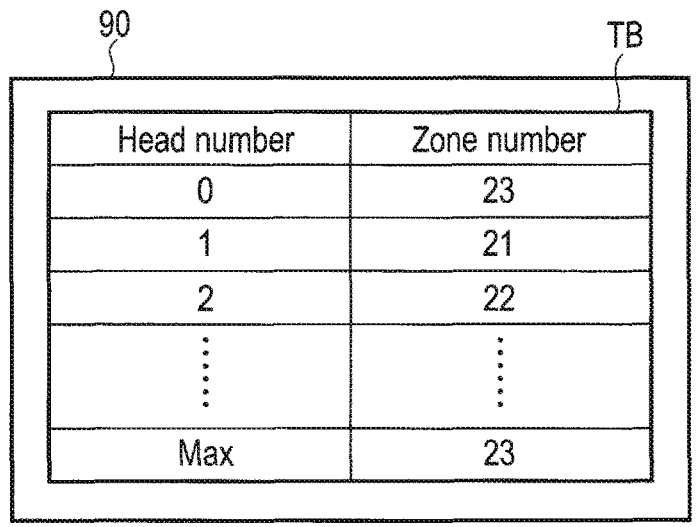
FIG. 11 shows an example of the table of the normal recording area according to the embodiment.

FIG. 11 shows an example of the table TB when the normal recording area CR is set for each different head 15. In the table TB shown in FIG. 11, the zone number is shown for each head number.

In the example shown in FIG. 11, the management unit 63 comprises the reference value of the difference between the outer track pitch and the inner track pitch for each different head 15. Thus, the disk 10 to which the normal recording area CR is set by the management unit 63 differs depending on the head 15. The management unit 63 records, in the table TB, the $23^{rd}$ zone as the normal recording area CR of the $0^{th}$ head 15, the $21^{st}$ zone as the normal recording area CR of the first head 15, the $22^{nd}$ zone as the normal recording area CR of the second head 15, and the $23^{rd}$ zone as the normal recording area CR of the $max^{th}$ head 15. The management unit 63 sets the area of the data area 10a other than the normal recording area CR as the shingled magnetic recording area SR.

Figure 12:
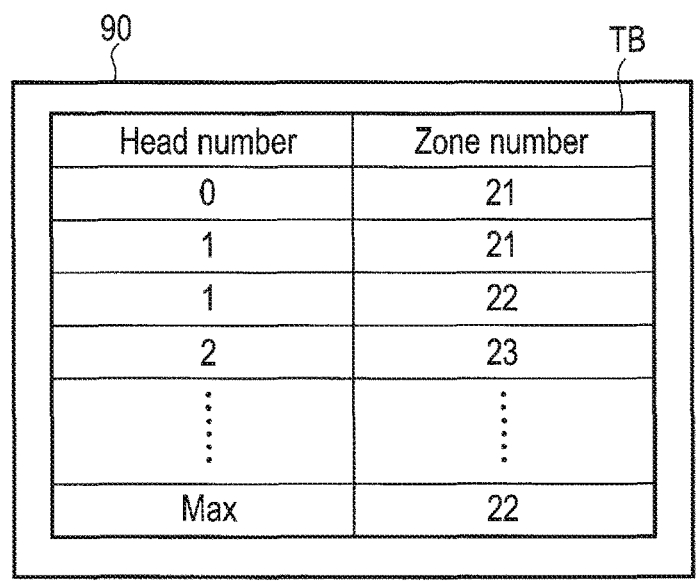
FIG. 12 shows an example of the table of the normal recording area according to the embodiment.

FIG. 12 shows an example of the table TB when at least one normal recording area CR is set for each different head 15.

In the example shown in FIG. 12, the management unit 63 comprises the reference value of the difference between the outer track pitch and the inner track pitch for each zone of the disk 10 of each different head 15. Thus, the management unit 63 sets at least one normal recording area CR for each different head. The management unit 63 records, in the table TB, the 21$^{st}$ zone as the normal recording area CR of the 0$^{th}$ head 15, the 21$^{st}$ zone as the normal recording area CR of the first head 15, the 22$^{nd}$ zone as the normal recording area CR of the first head 15, the 23$^{rd}$ zone as the normal recording area CR of the second head 15, and the 22$^{nd}$ zone as the normal recording area CR of the max$^{th}$ head 15. The management unit 63 sets the area of the data area 10a other than the normal recording area CR as the shingled magnetic recording area SR.

The write controller 65 writes a track to the normal recording area CR of the disk 10 set by the management unit 63 with the track pitch set in the management unit 63 by normal recording, and writes a track to the shingled magnetic recording area SR of the disk 10 set by the management unit 63 by shingled magnetic recording.

Figure 13:
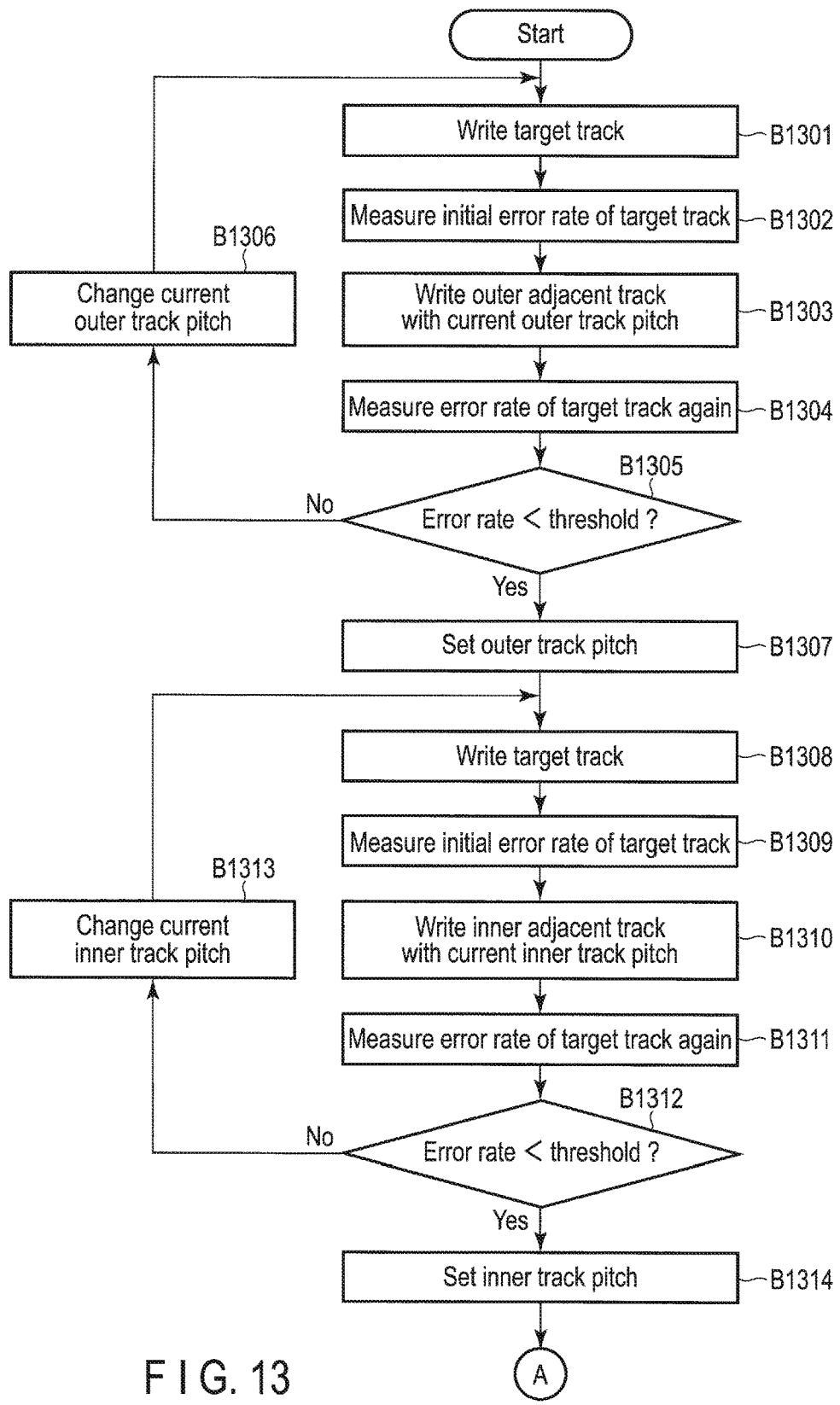
FIG. 13 is a flowchart showing a method for setting the track pitch between the target track and an adjacent track according to the embodiment.

FIG. 13 is a flowchart showing a method for setting the track pitch between the target track and an adjacent track according to the embodiment.

The system controller 130 writes the target track to a particular position of the disk 10 (B1301), and measures the initial error rate of the target track (B1302). The system controller 130 writes the outer adjacent track with the current outer track pitch relative to the target track (B1303), and measures the error rate of the target track again (B1304). The system controller 130 determines whether the error rate is greater than or equal to the outer threshold, or less than the outer threshold (B1305). When the system controller 130 determines that the error rate is greater than or equal to the outer threshold (NO in B1305), the system controller 130 changes the current outer track pitch to the next outer track pitch (B1306), and proceeds to the process of B1301. For example, the system controller 130 changes the current outer track pitch to the next outer track pitch obtained by subtracting a first particular value from the current outer track pitch. Alternatively, for example, the system controller 130 may change the current outer track pitch to the next track pitch obtained by adding the first particular value to the current outer track pitch. The first particular value may be either a fixed value or a variable. When the system controller 130 determines that the error rate is less than the outer threshold (YES in B1305), the system controller 130 sets the current outer track pitch as the outer track pitch between the target track and the outer adjacent track (B1307).

The system controller 130 writes the target track to a particular position of the disk 10 (B1308), and measures the initial error rate of the target track (B1309). The system controller 130 writes the inner adjacent track with the current inner track pitch relative to the target track (B1310), and measures the error rate of the target track again (B1311). The system controller 130 determines whether the error rate is greater than or equal to the inner threshold, or less than the inner threshold (B1312). When the system controller 130 determines that the error rate is greater than or equal to the inner threshold (NO in B1312), the system controller 130 changes the current inner track pitch to the next inner track pitch (B1313), and proceeds to the process of B1308. For example, the system controller 130 changes the current inner track pitch to the next inner track pitch obtained by subtracting a second particular value from the current inner track pitch. Alternatively, for example, the system controller 130 may change the current inner track pitch to the next inner track pitch obtained by adding the second particular value to the current inner track pitch. The second particular value may be the same as or different from the first particular value. The second particular value may be either a fixed value or a variable. When the system controller 130 determines that the error rate is less than the inner threshold (YES in B1312), the system controller 130 sets the current inner track pitch as the inner track pitch between the target track and the inner adjacent track (B1314), and proceeds to A.

Figure 14:
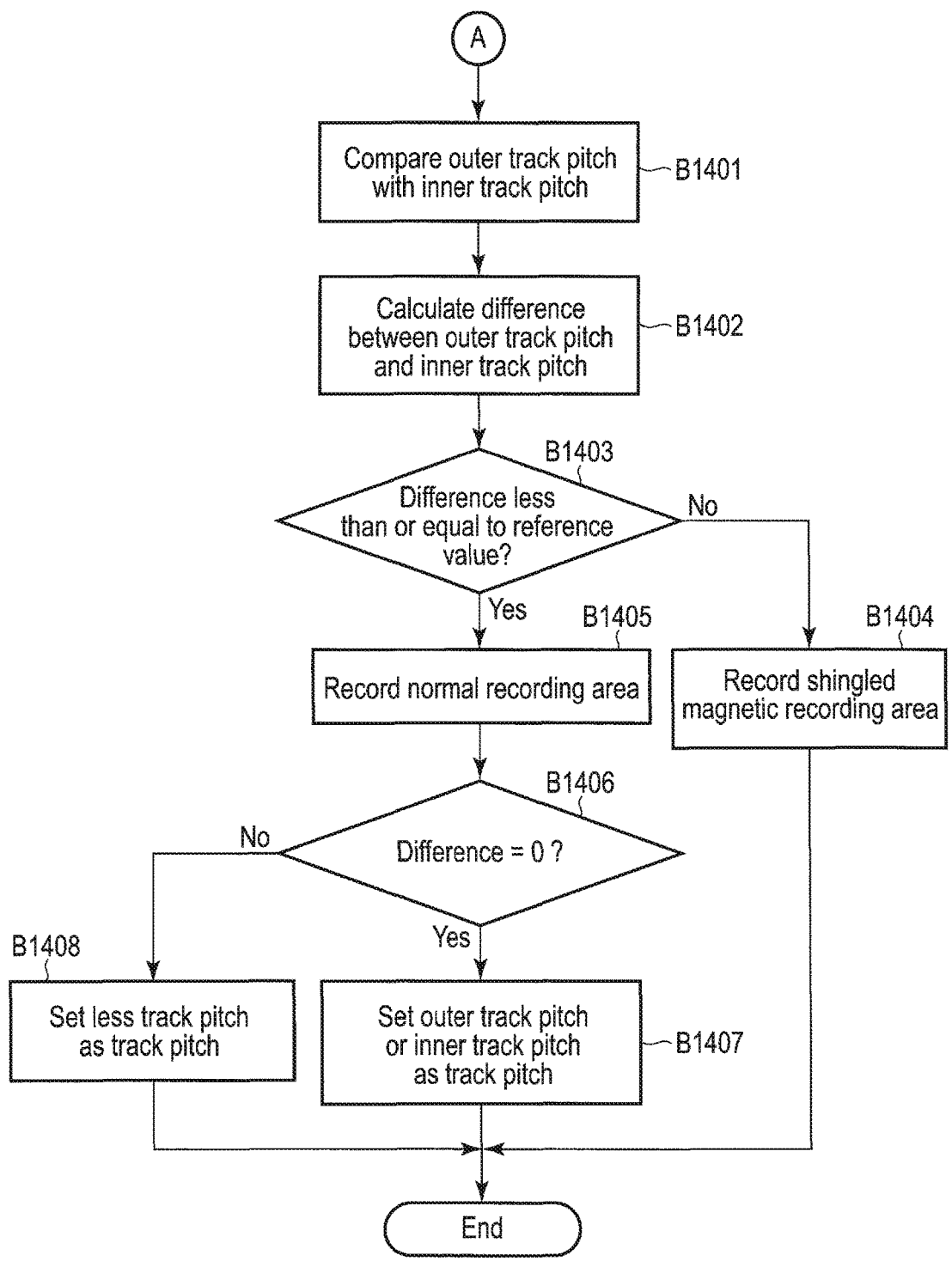
FIG. 14 is a flowchart showing a method for setting a normal recording area and a shingled magnetic recording area according to the embodiment.

FIG. 14 is a flowchart showing a method for setting the normal recording area and the shingled magnetic recording area according to the embodiment.

Subsequent to A of FIG. 13, the system controller 130 compares the outer track pitch with the inner track pitch (B1401), and calculates the difference between the outer track pitch and the inner track pitch (B1402). The system controller 130 determines whether the difference is less than or equal to the reference value, or greater than a reference value (B1403). The reference value is the threshold of the difference, and is different from the thresholds (the outer threshold and the inner threshold) shown in FIG. 13. When the system controller 130 determines that the difference is greater than the reference value (NO in B1403), the system controller 130 records, for example, in the system area 10b or the nonvolatile memory 90, the area to which the target track is written as the shingled magnetic recording area SR (B1404), and terminates the process. The system controller 130 may record the zone including the target track as the shingled magnetic recording area SR in, for example, the system area 10b or the nonvolatile memory 90.

When the system controller 130 determines that the difference is less than or equal to the reference value (YES in B1403), the system controller 130 records, for example, in the system area 10b or the nonvolatile memory 90, the area to which the target track is written as the normal recording area CR (B1405). The system controller 130 may record, for example, in the system area 10b or the nonvolatile memory 90, the zone including the target track as the normal recording area CR. The system controller 130 determines whether or not the difference is zero (31406). When the system controller 130 determines that the difference is zero (YES in B1406), the system controller 130 sets the outer track pitch or the inner track pitch as the track pitch between the target track and the outer and inner adjacent tracks (B1407), and terminates the process. When the system controller 130 determines that the difference is not zero (NO in B1406), the system controller 130 sets the less of the outer and inner track pitches as the track pitch between the target track and the outer and inner adjacent tracks (B1408), and terminates the process.

According to the present embodiment, the magnetic disk device 1 sets the track pitch between the target track and the outer adjacent track based on fringing when the outer adjacent track of the target track is written, and sets the inner track pitch between the target track and the inner adjacent track based on fringing when the inner adjacent track of the target track is written. The magnetic disk device 1 compares the outer track pitch with the inner track pitch, and calculates the difference between the outer track pitch and the inner track pitch. The magnetic disk device 1 determines whether the difference is less than or equal to a reference value, or greater than the reference value. When the difference is less than or equal to the reference value, the magnetic disk device 1 records, for example, in the system area 10b or the nonvolatile memory 90, the area to which the target track is written as the normal recording area CR. When the outer track pitch is different from the inner track pitch, the magnetic disk device 1 sets the less of the outer and inner track pitches as the track pitch between the target track and the outer and inner tracks. When the difference is greater than the difference, the magnetic disk device 1 records, for example, in the system area 10b or the nonvolatile memory 90, the area to which the target track is written as the shingled magnetic recording area SR. Thus, it is possible to provide a magnetic disk device capable of effectively writing data.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a disk;
a head which writes data to the disk; and
a controller which sets a first track pitch between a first track of the disk and a second track away from the first track in a first direction of a radial direction of the disk based on fringing when the second track is written, sets a second track pitch between the first track and a third track away from the first track in a second direction opposite to the first direction based on fringing when the third track is written, calculates a difference between the first track pitch and the second track pitch, sets, when the difference is less than or equal to a reference value, an area to which the first track is written in a first recording area for wiring a track to a position away from an adjacent track, and sets, when the difference is greater than the reference value, the area to which the first track is written in a second recording area for writing a track such that the track partially overlaps an adjacent track.

2. The magnetic disk device of claim 1, wherein
the controller determines whether the first track pitch is equal to the second track pitch, and
when the controller determines that the first track pitch is not equal to the second track pitch, the controller sets the less of the first and second track pitches as a track pitch between the first track and the second and third tracks.

3. The magnetic disk device of claim 1, wherein
the controller writes the first track, writes the second track to a position away from the first track in the first direction with a third track pitch, and measures a first error rate of the first track after the second track is written, and when the first error rate is greater than or equal to a first threshold, the controller writes the first track again, writes the second track to a position away from the first track in the first direction with a fourth track pitch less than the third track pitch, and measures the first error rate again, and
the controller writes the first track, writes the third track to a position away from the first track in the second direction with a fifth track pitch, and measures a second error rate of the first track after the third track is written, and when the second error rate is greater than or equal to a second threshold, the controller writes the first track again, writes the third track to a position away from the first track in the second direction with a sixth track pitch less than the fifth track pitch, and measures the second error rate again.

4. The magnetic disk device of claim 3, wherein
the controller measures the first error rate after the second track is written to the position away from the first track in the first direction with the fourth track pitch, and when the first error rate is less than the first threshold, the controller sets the fourth track pitch as the first track pitch, and
the controller writes the first track again, and measures the second error rate after the third track is written to the position away from the first track in the second direction with the sixth track pitch, and when the second error rate is less than the second threshold, the controller sets the sixth track pitch as the second track pitch.

5. A magnetic disk device comprising:
a disk;
a head which writes data to the disk;
a nonvolatile memory; and
a controller which
sets, for a plurality of tracks of the disk, a first track pitch set based on fringing when an adjacent track away in a first direction of a radial direction of the disk is written, and a second track pitch set based on fringing when an adjacent track away in a second direction opposite to the first direction is written,
records, in the nonvolatile memory, a first area from an area to which, of the tracks, a first track whose difference between the first track pitch and the second track pitch is less than or equal to a reference value is written to an area to which a second track is written, as a first recording area for writing a track to a position away from an adjacent track, and
records, in the nonvolatile memory, an area of the disk other than the first recording area as a second recording area for writing a track such that the track partially overlaps an adjacent track.

6. The magnetic disk device of claim 5, wherein
the controller records, in the nonvolatile memory, a second area from an area to which, of the tracks, a third track in which the difference is less than or equal to a reference value is written to an area to which a fourth track is written, as the first recording area.

7. A method for setting a recording area, applied to a magnetic disk device comprising a disk and a head which writes data to the disk, the method comprising:
setting a first track pitch between a first track of the disk and a second track away from the first track in a first direction of a radial direction of the disk based on fringing when the second track is written;
setting a second track pitch between the first track and a third track away from the first track in a second direction opposite to the first direction based on fringing when the third track is written;
calculating a difference between the first track pitch and the second track pitch, and when the difference is less than or equal to a reference value, setting an area to which the first track is written in a first recording area for writing a track to a position away from an adjacent track; and
when the difference is greater than the reference value, setting the area to which the first track is written in a second recording area for writing a track such that the track partially overlaps an adjacent track.

8. The method of claim 7, further comprising:
determining whether the first track pitch is equal to the second track pitch; and
when it is determined that the first track pitch is not equal to the second track pitch, setting the less of the first and second track pitches as a track pitch between the first track and the second and third tracks.

9. The method of claim 7, further comprising:
writing the first track;
writing the second track to a position away from the first track in the first direction with a third track pitch;
measuring a first error rate of the first track after the second track is written;
when the first error rate is greater than or equal to a first threshold, writing the first track again;
writing the second track to a position away from the first track in the first direction with a fourth track pitch less than the third track pitch;
measuring the first error rate again;
writing the first track;
writing the third track to a position away from the first track in the second direction with a fifth track pitch;
measuring a second error rate of the first track after the third track is written;
when the second error rate is greater than or equal to a second threshold, writing the first track again;
writing the third track to a position away from the first track in the second direction with a sixth track pitch less than the fifth track pitch; and
measuring the second error rate again.

10. The method of claim 9, further comprising:
measuring the first error rate after the second track is written to the position away from the first track in the first direction with the fourth track pitch;
when the first error rate is less than the first threshold, setting the fourth track pitch as the first track pitch;
writing the first track again;
measuring the second error rate after the third track is written to the position away from the first track in the second direction with the sixth track pitch; and
when the second error rate is less than the second threshold, setting the sixth track pitch as the second track pitch.

* * * * *